United States Patent [19]

Joo' et al.

[11] 4,439,382

[45] Mar. 27, 1984

[54] TITANIUM DIBORIDE-GRAPHITE COMPOSITES

[75] Inventors: Louis A. Joo', Johnson City; Kenneth W. Tucker, Elizabethton; Frank E. McCown, Jr., Bristol, all of Tenn.

[73] Assignee: Great Lakes Carbon Corporation, New York, N.Y.

[21] Appl. No.: 287,124

[22] Filed: Jul. 27, 1981

[51] Int. Cl.$^3$ .......................... C25B 11/04; C25C 3/12
[52] U.S. Cl. .................. 264/29.5; 264/29.6; 264/60; 264/63; 427/113; 427/294; 427/226; 427/227; 427/399; 204/294; 204/67
[58] Field of Search .................. 204/67, 294; 427/113, 427/126.3, 294, 226, 227, 399; 264/29.5, 29.6, 60, 63

[56] References Cited

U.S. PATENT DOCUMENTS

| | | | |
|---|---|---|---|
| T993,002 | 5/1979 | Kaplan | 204/243 R |
| 2,915,442 | 12/1959 | Lewis | 204/67 |
| 3,028,324 | 4/1962 | Ransley | 204/67 |
| 3,151,053 | 9/1964 | Lewis | 204/244 |
| 3,156,639 | 11/1964 | Kibby | 204/243 |
| 3,314,876 | 4/1967 | Ransley | 204/291 |
| 3,400,061 | 9/1968 | Lewis et al. | 204/67 |
| 4,071,420 | 1/1978 | Foster | 204/67 |

FOREIGN PATENT DOCUMENTS 922384  3/1973  Canada .

OTHER PUBLICATIONS

Billehaug, K. et al., "Inert Cathodes for Aluminium Electrolysis in Hall-Heroult Cells", *Aluminium*, vol. 56 (1980), pp. 642-648 and 713-718.

*Primary Examiner*—Michael R. Lusignan
*Assistant Examiner*—Richard Bueker
*Attorney, Agent, or Firm*—Adrian J. Good

[57] ABSTRACT

Titanium diboride graphite composite articles are produced by mixing $TiO_2$, petroleum coke and a binder to form a plastic dispersion. Articles are shaped by molding or extrusion and baked to carbonize the binder to form a baked carbon-$TiO_2$ composite. The article is impregnated with a molten or dispersed boron compound, then heated to drive $TiB_2$ forming reaction. The article is then further heated to a graphitizing temperature to form a graphite-$TiB_2$ composite useful as a cathode component in a Hall aluminum reduction cell.

19 Claims, No Drawings

TITANIUM DIBORIDE-GRAPHITE COMPOSITES

DESCRIPTION

BACKGROUND OF THE INVENTION

Aluminum metal has been produced for 90 years in the Hall cell by electrolysis of alumina in a molten cryolite salt electrolyte bath operating at temperatures in the range of 900°–1000° C. The reactivity of the molten cryolite, the need for excellent electrical conductivity, and cost considerations have limited the choice of materials for the electrodes and cell walls to the various allotropic forms of carbon.

Typically the Hall cell is a shallow vessel, with the floor forming the cathode, the side walls a rammed coke-pitch mixture, and the anode a carbon block suspended in the bath at an anode-cathode separation of a few centimeters. The anode is typically formed from a pitch-calcined petroleum coke blend, prebaked to form a monolithic block of amorphous carbon. The cathode is typically formed from a pre-baked pitch-calcined anthracite or coke blend, with cast-in-place iron over steel bar electrical conductors in grooves in the bottom side of the cathode.

During operation of the Hall cell, only about 25% of the electricity consumed is used for the actual reduction of alumina to aluminum, with approximately 40% of the current consumed by the voltage drop caused by the resistance of the bath. The anode-cathode spacing is usually about 4–5 cm., and attempts to lower this distance result in an electrical discharge from the cathode to the anode through aluminum droplets suspended in the bath.

The molten aluminum is present as a pad in the cell, but is not a quiescent pool due to the factors of preferential wetting of the carbon cathode surface by the cryolite melt in relation to the molten aluminum, causing the aluminum to form droplets; and the erratic movements of the molten aluminum from the strong electromagnetic forces generated by the high current density.

The wetting of a solid surface in contact with two immiscible liquids is a function of the surface free energy of the three surfaces, in which the carbon cathode is a low energy surface and consequently is not readily wet by the liquid aluminum. The angle of a droplet of aluminum at the cryolite-aluminum-carbon junction is governed by the relationship $$\cos\theta = \frac{\alpha_{12} - \alpha_{13}}{\alpha_{23}}$$

where $\alpha_{12}$, $\alpha_{13}$, and $\alpha_{23}$ are the surface free energies at the aluminum-carbon, cryolite-carbon, and cryolite-aluminum boundaries, respectively.

If the cathode were a high energy surface, such as would occur if it were a ceramic instead of carbon, it would have a higher contact angle and better wettability with the liquid aluminum. This in turn would tend to smooth out the surface of the liquid aluminum pool and lessen the possibility of interelectrode discharge allowing the anode-cathode distance to be lowered and the thermodynamic efficiency of the cell improved, by decreasing the voltage drop through the bath.

Typically, amorphous carbon is a low energy surface, but also it is quite durable, lasting for several years duration as a cathode, and relatively inexpensive. However, a cathode or a cathode component such as a $TiB_2$ stud which has better wettability and would permit closer anode-cathode spacing by reducing movement of molten aluminum could improve the thermodynamic efficiency and be very cost-effective.

Several workers in the field have developed refractory high free energy material cathodes. U.S. Pat. No. 2,915,442, Lewis, Dec. 1, 1959, claims a process for production of aluminum using a cathode consisting of the borides, carbides, and nitrides of Ti, Zr, V, Ta, Nb, and Hf. U.S. Pat. No. 3,028,324, Ransley, Apr. 3, 1962, claims a method of producing aluminum using a mixture of TiC and $TiB_2$ as the cathode. U.S. Pat. No. 3,151,053, Lewis, Sept. 29, 1964, claims a Hall cell cathode conducting element consisting of one of the carbides and borides of Ti, Zr, Ta and Nb. U.S. Pat. No. 3,156,639, Kibby, Nov. 10, 1964, claims a cathode for a Hall cell with a cap of refractory hard metal and discloses $TiB_2$ as the material of construction. U.S. Pat. No. 3,314,876, Ransley, Apr. 18, 1967, discloses the use of $TiB_2$ for use in Hall cell electrodes. The raw materials must be of high purity particularly in regard to oxygen content, Col. 1, line 73-Col. 2, line 29; Col. 4, lines 39–50, Col. 8, lines 1–24. U.S. Pat. No. 3,400,061, Lewis, Sept. 3, 1968 discloses a cathode comprising a refractory hard metal and carbon, which may be formed in a one-step reaction during calcination. U.S. Pat. No. 4,071,420, Foster, Jan. 31, 1978, discloses a cell for the electrolysis of a metal component in a molten electrolyte using a cathode with refractory hard metal $TiB_2$ tubular elements protruding into the electrolyte. Ser. No. 043,242, Kaplan et al. (Def. Pub.), filed May 29, 1979, discloses Hall cell bottoms of $TiB_2$. Canada Pat. No. 922,384, Mar. 6, 1973, discloses in situ formation of $TiB_2$ during manufacture of arc furnace electrodes. Belgian Pat. No. 882,992, PPG Ind., Oct. 27, 1980, discloses $TiB_2$ cathode plates.

Our co-pending applications, Ser. No. 186,181 now U.S. Pat. No. 4,376,029, and Ser. No. 186,182, now abandoned filed Sept. 11, 1980, disclose related subject matter.

SUMMARY OF THE INVENTION

Titanium Diboride, $TiB_2$ has been proposed for use as a cathodic element in Hall cells, giving an improved performance over the amorphous carbon and semi-graphite cathodes presently used.

It had previously been known that Titanium Diboride ($TiB_2$) was useful as a cathode component in the electrolytic production of aluminum, when retrofitted in the Hall cell as a component with or as a replacement for the carbon or semi-graphite cathode forms. The electrical efficiency of the cell was improved due to better conductivity, due mainly to a closer anode-cathode spacing; since wetting was improved. The corrosion resistance was improved, probably due to increased hardness, chemical inertness and lower solubility as compared to the carbon and graphite forms.

If the anode-cathode distance could be lowered, the % savings in electricity would be as follows:

| A–C distance | % savings |
| --- | --- |
| 3.8 cm. | std. |
| 1.9 cm. | 20% |
| 1.3 cm. | 27% |
| 1.0 cm. | 30% |

The principal deterrent to the use of $TiB_2$ as a Hall cell cathode or cathode element has been the sensitivity to thermal shock and the great raw material cost, approximately $25/lb. as compared to the traditional carbonaceous compositions, which cost about $0.60/lb.

We have invented an improved process for producing a $TiB_2$-carbon composite which shows excellent performance as a cathode or cathode component in Hall aluminum cells. The method is markedly more economical, and also produces an unexpectedly improved cathode when its performance is compared to the traditional carbon material.

The general method involves the formation of a porous baked carbon article from a conventional coke-binder mixture incorporating a first $TiB_2$ forming reactant, which may be either $TiO_2$ or a boron compound. The baked article is then impregnated with a dispersion of the second $TiB_2$ forming reactant, either molten or in a liquid dispersant, which is a boron compound if $TiO_2$ is the first $TiB_2$ forming reactant, and $TiO_2$ if a boron compound is the first $TiB_2$ forming reactant. After impregnation, the article is re-baked to carbonize or vaporize the dispersant, then further heated to a $TiB_2$ forming temperature, normally over 1200° C. and preferably about 1750° C. $TiO_2$ is mixed with coke particles and flour, then wetted and dispersed in a carbonizable liquid binder to form a plastic mass. The plastic mass is then molded or extruded to form the desired shape and baked on a cycle rising to 700°–1100° C. over a period of 1 to 10 days to carbonize the binder, forming a solid C-$TiO_2$ composite. Boron oxide ($B_2O_3$) or boric acid ($HBO_3$) is melted, then used to impregnate the composite in a heated pressure vessel at a pressure of $1.7 \times 10^5$ Pa to $6.9 \times 10^5$ Pa and approximately 500° C. temperature. (On fusion, $HBO_3$ decomposes to $H_2O$ & $B_2O_3$.)

The coke particles most useful in the forming process are selected size ranges of calcined delayed petroleum coke, made by heating a heavy hydrocarbon residue or fraction to about 500°–510° C. and holding the material in a coking drum for about 20 hours, while taking the gas oils vaporizing off to a combination tower for separation and recycling. The solid coke residue remaining is removed, then calcined at approximately 1200°–1300° C. to form the calcined coke useful in Hall cell electrodes or electrode components, and for conversion to graphite. Regular coke is isotropic, with a coefficient of thermal expansion (CTE) from 8 to $25 \times 10^{-7}$ cm/cm/°C., over the range of 0° to 50° C., relatively uniform on all 3 geometric axes, in physical properties, an acicular or needle coke will generally be anisotropic, having a CTE which is variant on the axes and less than $8 \times 10^{-7}$ cm/cm/°C. Coke flour may also be included using a particle size range with about 50% passing a 79 mesh/cm (200 mesh per in.) screen.

The filler carbon in the original formed article may also be obtained from other common sources, such as pitch coke, charcoal and metallurgical cokes from coal. A mean particle diameter of about 3 mm is preferred for the filler carbon or coke.

The $TiO_2$-C composite may also be impregnated with $B_2O_3$ or $H_3BO_3$ in water solution or dispersion, dried, and reimpregnated with the solution several times, to build up the amount of B compound needed for reaction with $TiO_2$.

The composite may also be impregnated under alternate cycles of vacuum and pressure with the boron compound dispersed in a carbonizable liquid impregnant, e.g., using a dispersion of $B_4C$ in molten petroleum pitch having a softening point from 110°–120° C. In each instance of impregnation with a carbonizable binder, it is carefully rebaked on a rising temperature cycle to allow for volatilization of lower molecular wt. reaction products without destruction of the physical integrity of the article. A normal rebake cycle will run from 1 to 10 days and reach a maximum temperature in the area of 700° to 1100° C., at which time the remaining carbon forms a rigid matrix holding the particulate matter in place.

The impregnating pitch may also incorporate a mixture of $TiO_2$ and a boron compound, for further reactive formation of $TiB_2$, in the quantity dispersable in the pitch without increasing the melted viscosity to the extent that impregnation is unduly hampered.

The method may alternately be used by dispersing a boron compound such as $B_4C$, $B_2O_3$, or $H_3BO_3$ in a mixture with the coke particles and pitch, heating, and forming the article, which is baked as above, cooled, then impregnated with a $TiO_2$ bearing impregnant, preferably a dispersion of $TiO_2$ in a petroleum pitch with a softening point in the 110° to 120° C. range and re-baked. The $TiO_2$ normally used is the ceramic pigment grade, which has a small particle size and high surface to weight ratio, which limits the amount dispersable in a liquid pitch to about 50% as a practical value.

After impregnation, the article is further heat treated to a temperature in excess of 1200° C. to produce a carbon-$TiB_2$ composite by the reaction $TiO_2 + B_2O_3 + 5C \rightarrow TiB_2 + 5CO$. Multiple impregnation cycles may be necessary to complete the reaction and produce an article with the properties needed to perform well in the harsh environment of the aluminum reduction cell.

Manufacture of $TiB_2$-C composites by this method has the advantage of forming $TiB_2$ predominantly on the exterior surfaces of the article and on the interior surfaces of the pores, to form a protected structure against attack by the electrolyte bath.

The article may be impregnated with a pitch or resinous type of carbonizable binder to make up carbon lost in the reaction and strengthen it, in which case it is necessary to bake the article at a temperature rising over 1 to 10 days on a continuous cycle through the range of 700°–1100° C. to carbonize the binder and form a matrix holding the particulate C and $TiB_2$ firmly in place.

Carbonizable liquid binders and impregnants may include various molten petroleum and coal tar pitches, thermosetting resins including phenolic condensates, lignin sulfonate, (poly)vinyl chloride pitch, ethylene tars and other carbonizable materials. A petroleum pitch with a softening point from 110° to 120° C. is the preferred impregnant, while a coal tar pitch of softening point 100° to 175° C. is preferred as the binder in the mix formulation.

A high temperature heat treatment step to form the $TiB_2$-graphite composite proceeds at temperatures of 2000° C. or higher, with 2200° C.–2400° C. being the preferred temperature range. To avoid oxidation and other adverse reactions, it is advantageous to conduct this operation in an inert atmosphere, e.g., argon.

The performance of graphite-$TiB_2$ composites in a Hall cell has been found surprisingly superior to the performance of the amorphous carbon-$TiB_2$ composites in test runs.

The structures formed from the graphite-$TiB_2$ composite are particularly useful as cathodic elements for assembly as inserts into the cathode blocks of Hall cells. The high cost of $TiB_2$ at present, as compared to pure carbon, makes it uneconomical to use a monolithic TiB$_2$ article as the cathode, or cathode component.

EXAMPLE 1

Blends of the following dry ingredients are mixed in parts by wt.:

|  | A | B | C | D |
|---|---|---|---|---|
| TiO$_2$ | 10 | 50 | 80 | 60 |
| Regular Petroleum coke particles (calcined) (mean diam. 3 mm) | 90 | 50 | 50 | 40 |
| Coal tar pitch (S.P. 110°–120° C.) | 26 | 28 | 38 | 20 |
| Theoretical % TiB$_2$ in composite[1] [2] | 8% | 57% | 79% | 77% |

[1]Assuming a 75–80% coke yield from the pitch during the bake cycle from ambient to 700°–1100° C.
[2]Assuming complete conversion of TiO$_2$ to TiB$_2$.

The TiO$_2$ and coke are charged into a sigma type mixer heated to about 160°–175° C. and thoroughly blended while being heated. When the dry blend has reached about 160° C., the pitch is added, melted, and the solid ingredients wetted by the molten pitch. After thorough mixing, the plastic mass is cooled and molded to the desired shape of the article.

The article is baked on a slowly rising temperature cycle, reaching 720° C. in a period of 6 days, and removed from the furnace and cooled.

After re-heating to about 500° C., the article, at that temperature or higher, is impregnated with molten B$_2$O$_3$, under 6.9×10$^5$ Pa pressure to a final pickup of sufficient boron-containing material to form the surface layer of TiB$_2$ on further heat treatment.

On further heating the reaction B$_2$O$_3$+TiO$_2$+5C→TiB$_2$+5CO starts to take place at about 800° C., becomes quite apparent at about 1200° C., and reaches a high reaction rate around 1750° C. Impregnation can be repeated with re-baking to build the desired quantity of TiB$_2$ in the composite. The article can be heated to 2200° C. or higher to graphitize the carbon, forming the final composite article of graphite-TiB$_2$, with the surface particularly rich in TiB$_2$.

EXAMPLE 2

The TiO$_2$-C composites of Example 1 are prepared and impregnated with molten H$_3$BO$_3$ instead of B$_2$O$_3$, and further treated as in the Example.

EXAMPLE 3

The TiO$_2$-C composites of Example 1 are prepared and impregnated with a water solution of B$_2$O$_3$. B$_2$O$_3$ is hydrated to H$_3$BO$_3$ in water and thus the two are interchangeable. The article is impregnated under 1.7−6.9×10$^5$ Pa of pressure, dried at about 100° C., heat treated @ 1200°–2000° C. and the process repeated to build up the desired amount of B compound in the structure of the article. Heat drives the reaction of TiO$_2$ and H$_3$BO$_3$, forming TiB$_2$ by the overall reaction:

$$TiO_2 + 2H_3BO_3 + 5C \rightarrow TiB_2 + 3H_2O + 5CO.$$

The article may be re-impregnated and re-baked to produce the TiB$_2$-carbon composite, but if a TiB$_2$-graphite composite is the desired end product, the article is further heated to 2200° C. or higher, which temperature will convert the amorphous C to semigraphite or graphite.

After heating to 1200° C. or higher, at which temperature TiB$_2$ begins to form, some porosity will be present at the surface due to the loss of CO or CO$_2$ formed by the overall reactions involved:

$$TiO_2 + 2H_3BO_3 + 5C \rightarrow TiB_2 + 3H_2O + 5CO$$

$$2C + 2HBO_3 \rightarrow B_2O_3 + H_2O + 2CO$$

$$TiO_2 + B_2O_3 + 5C \rightarrow TiB_2 + 5CO$$

$$2TiO_2 + Na_2B_4O_7.10H_2O + 10C \rightarrow 2TiB_2 + Na_2O + 10H_2O + 10CO.$$

A re-impregnation under alternate cycles of vacuum and pressure step with pitch or a dispersion of TiO$_2$ or boron compound or with a mixture of both of the reactants (TiO$_2$ and a boron compound) dispersed in a liquid carbonizable binder or impregnant may be used to seal this remaining porosity and densify the article. The preferred impregnant is a petroleum pitch having a melting point in the 100°–120° C. range used at about 165°–250° C. After impregnation, the article is baked to 700°–1100° C., and is re-heated to 2200° C. or higher to graphitize the carbon residue, and form TiB$_2$.

EXAMPLE 4

B$_4$C (10 g) is dispersed with calcined delayed petroleum coke particles (90 g) having a mean diameter of 3 mm in a sigma mixer and heated to about 170° C., coal tar pitch (25 g) with a softening point of 110° C. is added, and melted, and a plastic dispersion is formed. A cathodic element is molded under about 1.4×10$^7$ Pa (2000 PSI), baked on a cycle with the temperature rising to 800° C. in six days. After baking, the element is cooled, then impregnated with a dispersion of TiO$_2$ in petroleum pitch (30% by wt.) at 240° C. with 6.9×10$^5$ Pa (100 PSI). The impregnation step is repeated with alternate vacuum and pressure cycles. After impregnation, the element is heated to 720° C. over a six day period, then cooled. The impregnation-bake cycle is repeated several times to build up the required TiO$_2$ concentration firmly bound in the carbon matrix in the pore volume of the element. After baking, the element is further heated to 1750° C., which converts the reactants to TiB$_2$. The reaction produces CO as shown, and to seal porosity resulting from the loss of C from the matrix, the element is impregnated with petroleum pitch and baked as above to seal the porosity and strengthen the structure. Alternately, the element may be re-impregnated with the TiO$_2$ dispersion, baked, and re-heated as above. After heating to 1750° C., to form TiB$_2$, the element is further heated to 2250° C. to convert the carbon matrix to graphite. The final cathodic element has TiB$_2$ concentrated primarily on or near the surface.

The process disclosed uses the reactions forming TiB$_2$ from TiO$_2$, and B$_4$C, B$_2$O$_3$, or other boron compounds to form a TiB$_2$-graphite composite. The process may also be used to form other such composite structures from reactants forming refractory materials. In this instance the reactions are as follows:

$$TiO_2 + B_2O_3 + 5C \rightarrow TiB_2 + 5CO.$$

The reaction above probably proceeds through the formation of B$_4$C as an intermediate $$2B_2O_3 + 7C \rightarrow B_4C + 6CO$$

$$2TiO_2 + B_4C + 3C \rightarrow 2TiB_2 + 4CO.$$

The process is in general the generalized reaction taking place at temperatures in the range of 800°–3000° C. of:

$$MO + B_2O_3 + C \rightarrow MB + CO \text{ (where M is a metal)}$$

or $MO + B_4C + C \rightarrow MB + CO$ or $MO + N + C \rightarrow MN + CO$ (where N is a non-metal)

EXAMPLE 5

The article of Example 1, after baking, is impregnated with a dispersion of $B_4C$ in petroleum pitch with a softening point of 110°–120° C., at 240° C. under several cycles of vacuum and pressure of $6.9 \times 10^5$ Pa (100 PSI). After impregnation, the article is re-baked as above, then further heated to 1750° C. to drive the $TiB_2$-forming reaction to completion, re-impregnated with petroleum pitch and re-baked, then heated to 2250° C. to form the graphite-$TiB_2$ composite.

As may be seen, from the above, the process is useful for the formation of a large number of composite structures containing the end product of a reaction occurring at high temperatures in the presence of carbon, whether it enters the reaction or not.

We have found that the use of the approximate stoichiometric equivalents is preferable, e.g., $$TiO_2(80 \text{ g}) + B_2O_3(70 \text{ g}) + C(excess) \rightarrow TiB_2(70 \text{ g}) + 5CO \uparrow.$$

The reaction $Ti + 2B \rightarrow TiB_2$ will also occur under these conditions, but is economically unattractive due to the high cost of the elemental reactants. The reaction with borax occurs but is unattractive due to the volume of volatiles produced.

The reaction may occur with a number of boron compounds including borax and borates, however $B_2O_3$ and $H_3BO_3$ are the most economical and available compounds.

We claim:

1. A process for manufacturing a carbon-$TiB_2$ composite article comprising blending coke, a first carbonizable binder and a first $TiB_2$ forming reactant to form a dispersion, shaping said article, baking said article to carbonize said binder, impregnating said article under alternate cycles of vacuum and pressure at least once with a second $TiB_2$-forming reactant in liquid form, and heating said article to a $TiB_2$-forming temperature to form said carbon-$TiB_2$ composite article.

2. The process of claim 1 wherein the coke is a regular calcined petroleum coke having a mean particle diameter of approximately 3 mm.

3. The process of claim 1 wherein the binder is a molten coal tar pitch having a softening point from 100° to 120° C., used at a temperature of approximately 160° to 175°.

4. The process of claim 1 wherein the first $TiB_2$-forming reactant is $TiO_2$ and the second $TiB_2$-forming reactant comprises a boron compound selected from the group consisting of $B_4C$, $B_2O_3$, $H_3BO_3$ and $Na_2B_4O_7.10H_2O$.

5. The process of claim 1 wherein the second $TiB_2$-forming reactant is a boron compound selected from the group consisting of $B_4C$ and $B_2O_3$, dispersed in a liquid selected from the group consisting of molten petroleum pitch and phenolic condensates.

6. The process of claim 1 wherein the second $TiB_2$-forming reactant is molten $B_2O_3$, used at about 500° C.

7. The process of claim 1 wherein the second $TiB_2$-forming reactant is $B_2O_3$, $HBO_3$, or $Na_2B_4O_7.10H_2O$ in water solution.

8. The process of claims 1 or 15 wherein the article is baked on a temperature cycle rising to 700° to 1100° C. over a period of 1 to 10 days.

9. The process of claims 1 or 15 wherein the article is impregnated with the second $TiB_2$-forming reactant under alternate cycles of vacuum and a pressure of from $1.7 \times 10^5$ to $6.9 \times 10^5$ Pa (25 to 100 psi).

10. The process of claims 1 or 15 wherein the article after impregnation is baked on a cycle with the temperature rising to 700° to 1100° C. over a period of 1 to 10 days, then further heated to a $TiB_2$-forming temperature of at least 1200° C.

11. The process of claims 1 or 15 wherein after heating to the $TiB_2$-forming temperature the article is further heated to a temperature of at least 2200° C.

12. The process of claims 1 or 15 wherein the article after heating to the $TiB_2$-forming temperature is cooled, then re-impregnated at least once under alternate cycles of vacuum and pressure with the second $TiB_2$-forming reactant in liquid form, re-baked on a cycle rising to 700° to 1100° C. over a period of 1 to 10 days, and re-heated to the $TiB_2$-forming temperature of at least 1200° C.

13. The process of claims 1 or 15 wherein the article after heating to the $TiB_2$-forming temperature is impregnated with petroleum pitch under alternate cycles of vacuum and pressure at about 240° C. and $6.9 \times 10^5$ Pa, re-baked on a cycle rising to 700° to 1100° C. over a period of 1 to 10 days, and heated to at least 2200° C.

14. The process of claims 1 or 15 wherein the article is re-impregnated with a dispersion of both the first and second $TiB_2$-forming reactants in petroleum pitch under alternate cycles of vacuum and pressure of 1.7 to $6.9 \times 10^5$ Pa at about 240° C., baked on a cycle rising to 700° to 1100° C. over a period of 1 to 10 days, heated to at least 2200° C. to form a $TiB_2$-graphite composite.

15. The process of claim 1 wherein the first $TiB_2$-forming reactant is a boron compound and the second $TiB_2$-forming reactant is $TiO_2$.

16. The process of claims 1 or 15 wherein the article is shaped by molding at a pressure of about $1.4 \times 10^7$ Pa.

17. The process of claims 1 or 15 wherein the article is shaped by extrusion.

18. A process of manufacturing a cathodic element for a Hall aluminum cell comprising dispersing a first $TiB_2$-forming reactant selected from the group consisting of $B_4C$, $H_3BO_3$, and $B_2O_3$ and coke particles in molten coal tar pitch binder to form a plastic mass, shaping said mass to form said cathodic element, baking said element on a rising temperature cycle reaching 700° to 1100° C. over a period of 1 to 10 days, removing said element from said furnace, impregnating said element under a pressure of about $6.9 \times 10^5$ Pa with $TiO_2$ dispersed in molten petroleum pitch, re-baking said element to 700° to 1100° C. over a period of 1 to 10 days, heating said element to 1750° C. to form a carbon-$TiB_2$ composite, re-impregnating said element with said petroleum pitch at about 240° C. under about $6.9 \times 10^5$ Pa pressure, re-baking said element to 700° to 1100° C. over 1 to 10 days, and heating said element to 2250° C.

in an argon atmosphere to form a graphite-TiB$_2$ composite cathodic element.

19. A process of manufacturing a cathodic TiB$_2$-graphite element for a Hall aluminum cell comprising dispersing TiO$_2$ and coke particles in molten coal tar pitch to form a plastic mass, forming said element by molding or extrusion, baking said element on a rising temperature cycle over a period of 1 to 10 days, the temperature reaching from 700° to 1100° C., cooling said element, impregnating said element under alternate cycles of vacuum and a pressure of from 1.7 to 6.9×10$^5$ Pa with a boron compound selected from the group consisting of molten B$_2$O$_3$, at approximately 500° C., molten H$_3$BO$_3$ at approximately 500° C., B$_2$O$_3$ in water solution, H$_3$BO$_3$ in water solution, and B$_4$C dispersed in molten petroleum pitch, drying said element at a temperature of approximately 100° C. if a water solution was used when impregnating said element, re-baking said element on a 1 to 10 day cycle, rising to 700° to 1100° C., heating said element to approximately 1750° C., cooling, and re-impregnating said element with said molten petroleum pitch, baking said element over a 1 to 10 day cycle, rising to 700° to 1100° C., and heating to approximately 2250° C. to form said TiB$_2$-graphite element.

* * * * *